United States Patent
Kwan et al.

(10) Patent No.: US 11,928,238 B1
(45) Date of Patent: Mar. 12, 2024

(54) PROTECTING CUSTOMER DATA USING DIFFERENT DOMAINS

(71) Applicant: Amazon Technologies, Inc., Seattle, WA (US)

(72) Inventors: Yuk Lun Patrick Kwan, Bellevue, WA (US); Gary Rittinger, Kent, WA (US); Ting-Jui Ho, Seattle, WA (US); Gabriel Marcelo Fusca, Seattle, WA (US); Barrett Lowell Brumitt, Port Ludlow, WA (US)

(73) Assignee: Amazon Technologies, Inc., Seattle, WA (US)

( * ) Notice: Subject to any disclaimer, the term of this patent is extended or adjusted under 35 U.S.C. 154(b) by 161 days.

(21) Appl. No.: 17/301,337

(22) Filed: Mar. 31, 2021

(51) Int. Cl.
 *G06F 21/62* (2013.01)
 *G06Q 10/0637* (2023.01)
(52) U.S. Cl.
 CPC ...... *G06F 21/6245* (2013.01); *G06Q 10/06375* (2013.01); *G06F 2221/2101* (2013.01); *G06F 2221/2105* (2013.01)
(58) Field of Classification Search
 CPC ......... G06F 21/6245; G06F 2221/2101; G06F 2221/2105; G06Q 10/06375
 See application file for complete search history.

(56) References Cited

U.S. PATENT DOCUMENTS

| | | | | |
|---|---|---|---|---|
| 2013/0219217 | A1* | 8/2013 | Seren .................. | G06F 11/3664 714/E11.178 |
| 2019/0050791 | A1* | 2/2019 | Larson ................. | G06Q 10/087 |
| 2021/0089658 | A1* | 3/2021 | Dunjic ................. | G06F 21/577 |
| 2022/0129369 | A1* | 4/2022 | Sharma ............... | G06F 21/6245 |

* cited by examiner

*Primary Examiner* — Alexander Lagor
*Assistant Examiner* — Felicia Farrow
(74) *Attorney, Agent, or Firm* — Lee & Hayes, P.C.

(57) ABSTRACT

A domain registry (DR) service executing within a service provider network protects data, such as account data, that is associated with different accounts for testing and/or performing other operations/actions by registering an account with one or more domains. The DR service may register an account in one or more domains based on a request by a user. The operations performed that uses/changes data associated with accounts may be restricted based on the domains for which an account is registered. For example, an account that is registered in a "testing" domain may have different workflows/operations performed using the account data associated with the account registered in the testing domain as compared to an account that is not part of the testing domain.

20 Claims, 7 Drawing Sheets

PROTECTING CUSTOMER DATA USING DIFFERENT DOMAINS

BACKGROUND

Many different types of entities store and utilize large amounts of data. This may include account data, as well as other types of data, for a large number of accounts. In some cases, an entity may want to test different scenarios using this data. For instance, an entity may want to test scenarios that may include an update to software, a change to a billing procedure, a change to usage of a service, a change in location where the entity provides services, and the like. As an example, an entity may want to know how a possible billing change will affect customers before actually implementing the billing change. It may be very difficult, computationally costly, and time-consuming, however, to test these different scenarios. For example, it may be difficult for the entity to utilize the account data, and the other types of data without corrupting or changing data relied upon by the different systems. Further, creating and testing a complex scenario may be very expensive, computationally costly, and time-consuming.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
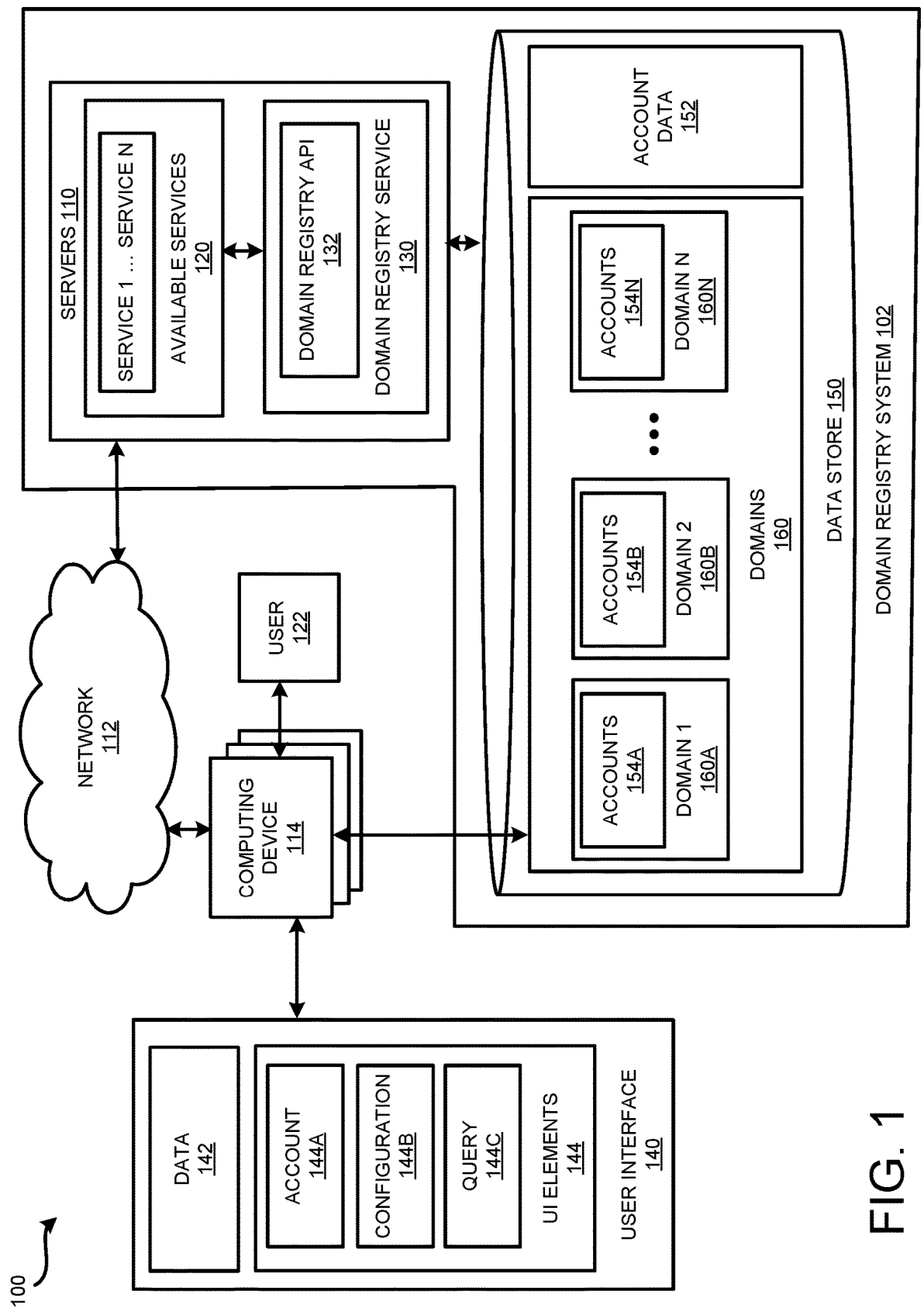
FIG. 1 is a software and network architecture diagram showing aspects of the configuration and utilization of a domain registry system for protecting customer data using different domains.

The following detailed description is directed to technologies for protecting customer data using different domains. In some configurations, a domain registry (DR) service executing within a service provider network protects data associated with different accounts (which may be referred to herein as "account data") for testing and/or performing other operations/actions by registering an account with one or more domains. The DR service may register an account in one or more domains based on a request by a user. As used herein, a "domain" includes one or more entities, such as accounts of a service provider network, that are grouped together. In some configurations, a user specifies accounts to include within a domain. According to some examples, an account may belong to more than one domain.

The operations performed may be restricted based on the domains for which an account is registered. For example, an account that is registered in a "testing" domain may have different workflows/operations performed using the account data associated with the account registered in the testing domain as compared to an account that is not part of the testing domain.

Instead of having to perform tests using account data in a separate "testing environment" that is not part of a "production environment", a customer of the service provider network can test (or perform or her operations) within the production environment. As used herein, a "production environment" includes functionality that is released to users or customers of the service provider network. A "testing environment", on the other hand, is an environment in which functionality (e.g., different scenarios) are tested before being made available to the users or customers of the entity.

By utilizing techniques described herein, operations (e.g., test scenarios, workflows, and/or other operations to be restricted to specified accounts) may be performed in the production environment using account data associated with an account that has been registered with a specific domain. In this way, different operations can be restricted to account data of one or more accounts that are registered with a specific domain rather than affecting other accounts and account data that are registered in other domains of the production environment. Further, using functionality and account data from the production environment of the service provider network provides a more complete understanding of how a change to one or more operations may affect customers.

Still further, unlike the use of multiple lists that identify accounts on which operations may be performed, techniques described herein allow an account to be associated with one or more domains that indicate whether operations are authorized/unauthorized. In this way, separate services may readily determine (e.g., via a query) whether an operation is authorized and what accounts are registered to a specific domain. For example, a billing service may create accounts within a test domain to test new billing operations within the production environment while protecting/safeguarding account data associated with accounts registered to one or more other domains within the production environment.

According to some configurations, the DR service, and other services may expose different input mechanisms, such as a graphical user interface (GUI), a user interface (UI), a command line interface (CLI), an application programming interface (API), and the like. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

As briefly discussed above, a DR service is configured to register accounts with one or more domains that may be specified by a user. In some examples, the user registers/ creates one or more accounts to be registered with a testing domain for scenario testing (e.g., testing new billing operations), while other accounts within the production environment are associated with one or more other domains. According to some configurations, the DR service may determine whether an operation is authorized to alter account data. For instance, the DR service may determine that an operation associated with the registered accounts of a domain is authorized but the operation is not allowed/ authorized for account data that is associated with other accounts not registered in the domain. In some examples, the DR service determines if an operation can be performed using a specified account(s). When the operation is not allowed, the operation can be prevented, and an alarm may be provided to one or more designated users that indicates the attempt to perform the unauthorized operation. According to some examples, a user may associate an account with a domain by selecting a few options from a user interface, such as from a graphical user interface, and/or via use of a domain registry API.

After a user registers an account with a domain using the UI, or using some other mechanism such as an API, the user may perform operations (e.g., run a test scenario) using the account data that is associated with the registered accounts for the domain. For instance, a first billing workflow may be performed for accounts specified in one domain, and a second billing workflow may be performed for accounts in one or more other domains. In this way, the user may use the functionality of the production environment to perform operations involving accounts registered in a domain without risking corruption of the account data of other accounts that are not registered to the domain (since that data is not utilized or modified to perform the different scenario tests/ operations).

For example, assume that an entity wants to execute a test scenario that includes generating weekly bills for some accounts while not affecting the monthly billing for other accounts. In this example, a user may register some accounts in a "weekly billing" domain, and other accounts can remain registered with a "monthly billing" domain. After registering the accounts with the weekly billing domain, operations may be performed using the account data associated with the registered accounts in the weekly billing domain to generate the weekly bills while not allowing weekly bills to be generated for the accounts registered in the monthly domain.

In another example, a user may test a new service before deployment of the service to customers of the service provider network. For example, the user may create accounts in a test domain that utilize the new service. After creating the accounts in the test domain, the new service may interact with functionality of the services provided by the service provider network that are already deployed in the production environment of the service provider network. In this way, the new service may be tested in a production environment as compared to having to test the new service in a test environment. Additional details regarding the various components and processes described briefly above for protecting customer data using different domains will be presented below with regard to FIGS. 1-7.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, where tasks can be performed by remote computing devices that are linked through a communications network. In a distributed computing environment, program modules can be located in both local and remote storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the configuration and utilization a domain registry system 102 for protecting customer data using different domains. It is to be appreciated that the environment 100 is merely illustrative and that the various configurations disclosed herein can be utilized in many different types of computing environments.

To provide the DR service 130 and the other functionality disclosed herein, the DR system 102 may include one or more servers 110. The servers 110 can execute software components to provide the services described herein, including protecting/safeguarding account data 152 associated with one or more customers of the service provider network using the DR service 130 and different available services 120 provided by a service provider and/or some other entity. The software components can execute on a single server 110 or in parallel across multiple servers 110 in the DR system 102. In addition, a software component can consist of subcomponents executing on different servers 110 or other computing devices in the DR system 102. Various components can be implemented as software, hardware, or any combination of the two. In this regard, it is to be appreciated that the DR system 102 shown in FIG. 1 has been simplified for discussion purposes and that many additional software and hardware components can be utilized.

A user 122 of the DR system 102 can utilize the DR service 130, via a computing device 114 or some other input device, to access the DR system 102 through a network 112. According to some configurations, the computing device 114 may be configured to understand natural language voice commands and complete tasks for the user, such as tasks related to domain registry as described herein. As illustrated, a user may interact with the DR service 130 through a user interface 140. In some examples, the user 122 is a customer of a service provider network.

The computing device 114 may be one or more devices, such as but not limited to a smart phone, a smart watch, a personal computer ("PC"), desktop workstation, laptop computer, tablet computer, notebook computer, personal digital assistants ("PDA"), electronic-book reader, game console, set-top box, consumer electronics device, server computer, a telephone, a telephone conferencing device, video conferencing device, or any other type of computing device capable of connecting to the network 112 and communicating with the DR system 102. In other configurations, the computing device 114 may be configured to communicate with one or more other devices to receive commands from users and/or perform processing related to functionality of the DR system 102.

As illustrated, the computing device 114, or some other device or component, may couple with a DR system 102 over a network 112. The network 112 may represent an array or wired networks, wireless networks (e.g., Wi-Fi), or combinations thereof. The DR system 102 may generally refer to a network-accessible platform implemented as a computing infrastructure of processors, storage, software, data access, and so forth that is maintained and accessible via the network 112, such as the Internet. These services may not require end-user knowledge of the physical location and configuration of the system that delivers the services. Common expressions associated with these remote services, such as the DR system 102, include "on-demand computing", "software as a service (SaaS)", "platform computing", "network accessible platform", and so forth.

As illustrated, the DR system 102 may comprise one or more network-accessible resources, such as servers 110. These resources comprise one or more processors and computer-readable storage media executable on the processors. In some configurations, the users 122 may be identified and/or authenticated before interacting with the computing device 114 that is associated with the DR system 102.

The network 112 can be a local-area network ("LAN"), a wide-area network ("WAN"), the Internet, or any other networking topology known in the art that connects the user devices to the DR system 102. The user 122 can use an application (not shown) executing on computing device 114 that provides user interface 140 to access and utilize the DR service functionality provided by the servers 110. In some examples, the application is a web browser application (not shown), such as the Amazon® Silk® web browser, or some other web browser. Generally, a web browser application exchanges data with the servers 110 in the DR system 102 using the hypertext transfer protocol ("HTTP") over the network 112. The application might also be a stand-alone client application configured for communicating with the servers 110.

The application can also utilize any number of communication methods known in the art to communicate with the DR system 102 and/or the servers 110 across the network 112, including remote procedure calls, SOAP-based web services, remote file access, proprietary client-server architectures, and the like. According to some configurations, the application may provide a user interface 140 that can be utilized by the user 122 to configure settings associated with the DR service 130 and/or the computing device 114. Typically, a user 122 interacts with the computing device 114 using user interface 140.

As discussed above, a DR service 130 is configured to register accounts with one or more domains 160 that may be specified by the user 122. In some examples, a user, such as user 122, may register one or more accounts 154A with a first domain 160A for scenario testing, while one or more accounts 154, such as accounts 154B, may be registered with a different domain 160B such that the scenario testing is not performed using account data 152 that is associated with the accounts 154B. According to some configurations, the DR service 130 may protect/safeguard the account data 152 from a production environment of the service provider network by allowing the user 122 to segment the accounts into different domains 160 that can be configured to allow/restrict different operations. For example, the DR service 130 may allow the user 122 to access account data 152 data stored in one or more data stores 150 for operations for accounts 154 registered with one domain but restrict account data 152 for accounts 154 registered with another domain.

In some examples, the DR service 130 accesses or receives data that indicates one or more accounts to create/register with different domains 160. According to some configurations, a customer of the service provider network, such as user 122, provides an indication of the accounts to register with a specified domain 160. In some examples, the user 122 may also include sub-domains within a particular domain 160 (not shown). For instance, a testing domain may have different sub-domains such that a portion of the accounts associated with a sub-domain are treated differently than the accounts associated with a different sub-domain.

According to some examples, the user 122 may associate an account 154 with a domain 160 by selecting a few options from a user interface, such as from user interface 140. According to some configurations, the DR service 130 provides to a user computing device 114 data 142 within a user interface 140 (e.g., a "GUI"). In some configurations, the user interface 140 includes selectable UI elements 144 that allow a user 122 to select, configure, and/or specify different data associated with creating/registering account(s) with one or more domains as well as running operations with one or more domains (e.g., for testing one or more different scenarios).

In the example presented in FIG. 1, the UI elements include account UI elements 144A, configuration UI elements 144B, and query UI elements 144C. The account UI elements 144A may be utilized to create/select accounts 154 to associate with a domain 160. For example, the user 122 may utilize the account UI elements 144A presented within UI 140 to register one or more accounts with one or more of the domains 160. The user 122 may also use the configuration UI elements 144B to configure what operations are allowed within a particular domain 160, what account data 152 associated with the accounts 154 registered to a particular domain can be accessed, and the like. The user 122 may utilize the query UI elements 144C to obtain data associated with accounts 154 registered to a particular domain.

After associating an account with a domain 160 using the UI, or using some other mechanism (e.g., the domain registry API 132), the user 122 may perform operations (e.g., run a test scenario) using the account data 152 that is associated with the accounts for a particular domain 160. For instance, the user 122 may utilize the UI 140, or some other method, to have a bill generated using a different billing procedure for the accounts in a particular domain. For example, in response to receiving a request from the user 122 to generate a bill using operations that are authorized to run using account data 152 associated with the accounts 154 of a specified domain(s) 160, the DR service 130 may request a bill from a billing service, such as billing service 120A, illustrated in FIG. 2. For example, the billing service 120A may return billing data (e.g., for a requested period) to the user 122 using UI 140 that may include information, such as but not limited to billing start period, billing end period, line items for services utilized, fess charged, refunds provided, and the like.

According to some configurations, the user 122 may request to perform operations that include accounts for a specified domain 160. In this way, the user 122 may test complex scenarios without risking corruption of the account data 152 of other accounts 154 that are not registered to the specified domain (since that data is not utilized or modified to perform the different scenario tests/operations) while still being able to obtain reliable test results.

As another more specific example, assume that an entity wants to execute a test scenario that includes generating weekly bills for some customers while still billing other customers on a monthly basis. For instance, the user 122 may register some accounts 154 in the domain 160 associated with bi-monthly billing, and other accounts associated with a default domain 160, or a different specified domain 160, that will receive a monthly bill. After registering the accounts 154 with the domain 160 to include bi-monthly bills, operations may be performed using the account data 152 to generate the bi-monthly bills while not allowing bi-monthly bills to be generated for the accounts 154 not registered in the bi-monthly domain 160. For instance, in some examples, the DR service 130 causes the billing service 120C to generate bi-monthly bills for the accounts that were registered to the bi-monthly billing domain 160 and restricts generation of bi-monthly bills for other domains 160. In this way, an entity can run/test different operations in one domain 160 before implementing a change to other domains.

In yet another example, a user 122 may want to test one of the available services 120 (e.g., a new service from among the available services 120) before deployment to customers of the service provider network. For example, the user 122 may create accounts in a test domain 122 that utilize the new service. After creating the accounts in the test domain, the new service may interact with other available services 120 that are already deployed in the service provider network. In this way, the user 122 may test the new service in a production environment as compared to testing the new service in a test environment. After the accounts are registered with the different domains 160, the user 122, or some other program/device, may perform operations in the domains while protecting the account data 152 of accounts outside of the domain.

According to some examples, the DR service 130 may expose a domain registry Application Programming Interface (API) 132. In some configurations, functionality provided by the DR service 130 may be accessed using the domain registry API 132 that may be a Web API. The domain registry API 132 might also be used to request data from one or more data stores such as data store 150, services 120, and/or other applications, and the like. Some exemplary APIs include but are not limited to specifying accounts to register with a domain 160, specifying what operations are allowed within a domain, querying what accounts are registered with a domain, and the like.

As discussed briefly above, the DR service 130 is configured to register accounts with domains such that when performing operations, a user 122 may restrict the operations from affecting account data 152 for other accounts that are not registered in the domain. The DR service 130 may access data from different databases/data stores, and/or from the same database/data store, such as data store 150.

In some configurations, the DR service 130 may access other available services 120 to obtain data that may be used by the DR service 130. For example, the DR service 130 may access a monitoring service, a billing service, an event-driven service, a workflow service, and the like (See FIG. 2 and related discussion). Additional details regarding the various processes described above with regard to FIG. 1 will be provided below with regard to FIGS. 2-7.

Figure 2:
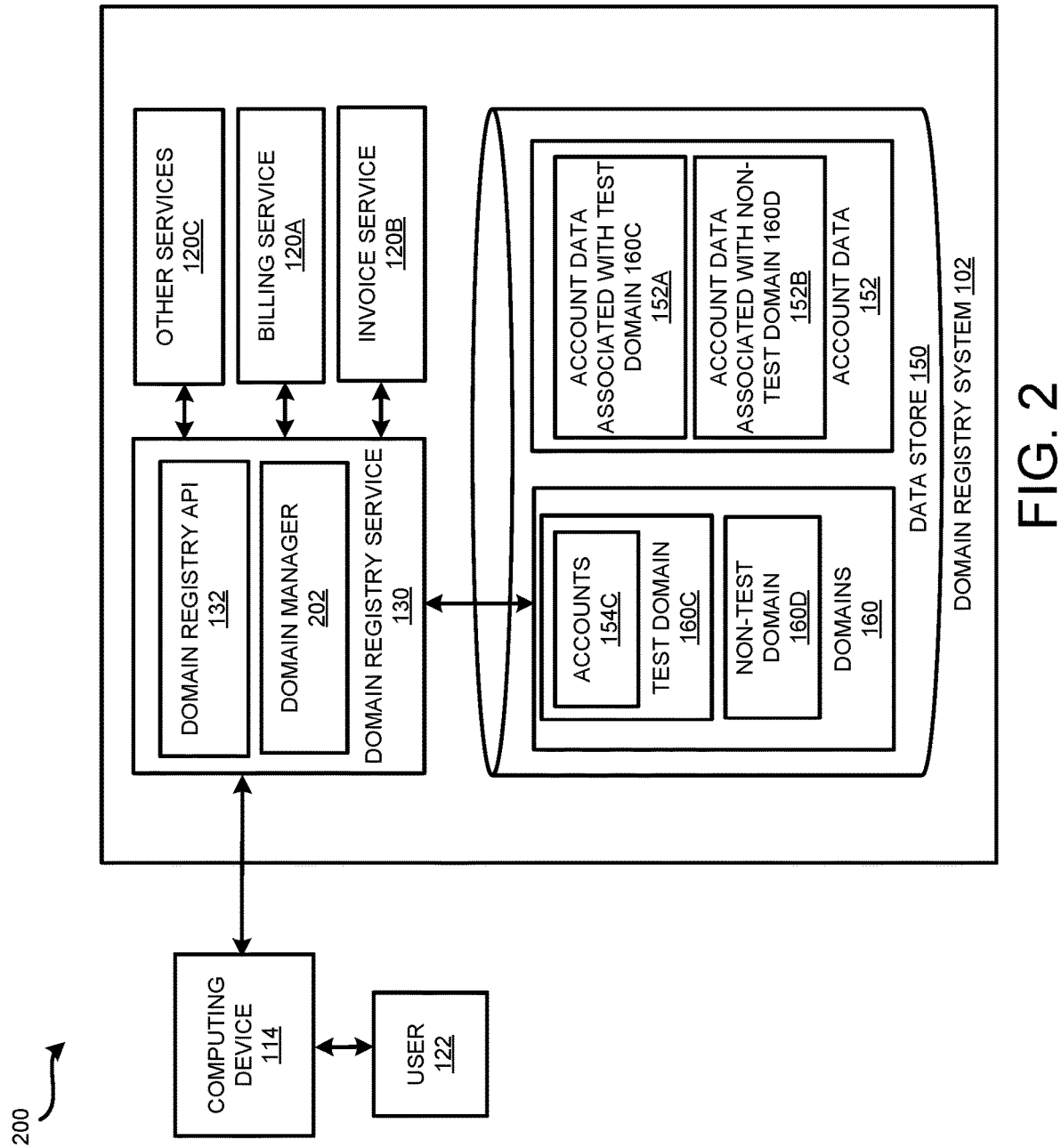
FIG. 2 is a software and network architecture diagram showing aspects of a domain registry system that utilizes various services associated with a service provider to facilitate protecting customer data.

FIG. 2 is a software and network architecture diagram showing aspects of a DR system 102 that utilizes various services 120 associated with a service provider to facilitate protecting customer data. It is to be appreciated that the environment 200 is merely illustrative and that the various configurations disclosed herein can be utilized in many different types of computing environments. FIG. 2 is similar to FIG. 1 but provides more details of the DR system 102.

As illustrated, DR system 102 includes DR service 130, billing service 120A, invoice service 120B, and other services 120C. The DR service 130 may communicate with the services using one or more Application Programming Interfaces (APIs), such as domain registry API 132 exposed by the DR service 130. In some examples, each service may expose one or more APIs (not shown) that can be used by a service, or some other component or application, to access functionality and/or data provided by the service.

As discussed briefly above, the domain registry API 132 may expose different functionality, such as but not limited to a create registration API, one or more query registration APIs (e.g., check registration for a particular account, obtain information about accounts registered in a domain, . . . ), an update registration API, and the like. For instance, the create registration API may receive an identifier of the entity requesting the creation of an account, a domain to which the account is to be registered, and/or other data (e.g., account identifier associated with the customer. In some examples, the domains are configurable by the user 122. For example, the user 122 specifies the name of the domain and the accounts that are registered within the domain. When the domain does not exist, the DR service 130 may create the domain. When the domain exists, the DR service 130 may add the account to the domain.

The update registration API may be used to update a registration of an account with a domain. For example, the user 122 may specify to change a registration of an account 154 to a different domain, delete a domain, and the like. The query API(s) may be used to determine what accounts are registered in a domain and/or check whether or not a specific account is part of the domain in which an operation is requested to be performed using account data associated with a particular account.

In the example illustrated in FIG. 2, a user 122 interacts with the DR service 130 using computing device 114. As discussed above, the user 122 may specify what accounts 154 are to be part of a domain such that when operations are performed in the domain, account data 152 associated with accounts 154 that are not registered to the domain is protected/safe guarded.

In the current example, the user 122 has requested (e.g., via the domain registry API, the UI 140, or some other input mechanism) to associate accounts 154C with a test domain 160C. The non-test domain 160D includes other accounts that are safe guarded from operations that occur with accounts 154C in the test domain. For purposes of explanation, assume that the test domain 160C is used to test a new billing procedure within the production environment of the service provider network. Before testing the new billing procedure, an authorized user adds the test accounts 154C to the test domain 160C. In response to receiving a request to add an account 154C to the test domain 154C from the user 122, the DR service 130 adds data to the data store 150 indicating the registration. In some examples, the DR service 130 adds an entry to a database indicating the registration. If the domain/account does not already exist, the DR service 130 may create the new domain/account.

After registering the accounts 154C with the test domain 160C, the user 122 may run the new billing procedure/workflow using the test accounts 154C while not impacting the other accounts that are not registered to the test domain. As used herein, a workflow refers to a sequence of one or more operations to perform. In some examples, a workflow service (not shown) may be used to execute a workflow. Generally, a workflow may include operations that are performed by a single service 120 and/or multiple services 120 of the service provider network.

As illustrated, the billing service 120A may run the new billing procedure/workflow and interact with services 120, such as invoice service 120B and/or other services 120C that are provided within the production environment of the service provider network. The new billing procedure may perform operations that are not authorized to be performed on accounts associated with other domains 160, such as non-test domain 160D. In some configurations, before account data 152 is impacted by performance of a requested operation, the domain manager 202, or some other component or device, may determine whether the account data 152 is associated with an account within the test domain 160C. If the account data 152A is part of the account data associated with the test domain 160C then the data can be changed. In this example, if the account data 152A was not part of the account data associated with the test domain 160C then the domain manager 202, or some other component or device, would prevent the operation to alter the account data 152A. According to some configurations, an alarm may be provided to one or more designated users that indicates the attempt to perform the unauthorized operation. The user 122 may also receive results of the test in different examples.

In some examples, the DR service 130 may include a domain manager 202 that monitors for problems (e.g., failed process, . . . ). When a problem is detected (e.g., a process associated with the DR service 130 has stopped), the domain manager 202 in the DR service 130 attempts to resolve the problem without user interaction. For example, the DR service 130 may restart the process and continue the process from the point in time the problem was detected, in a fully or partially automated manner, and possibly without requiring any input from a user. As another example, the DR service 130 may restart the process from the beginning. In case of problems that cannot be automatically resolved, the DR service 130 may present detailed diagnostic information to the user (e.g., using UI 140).

Figure 3:
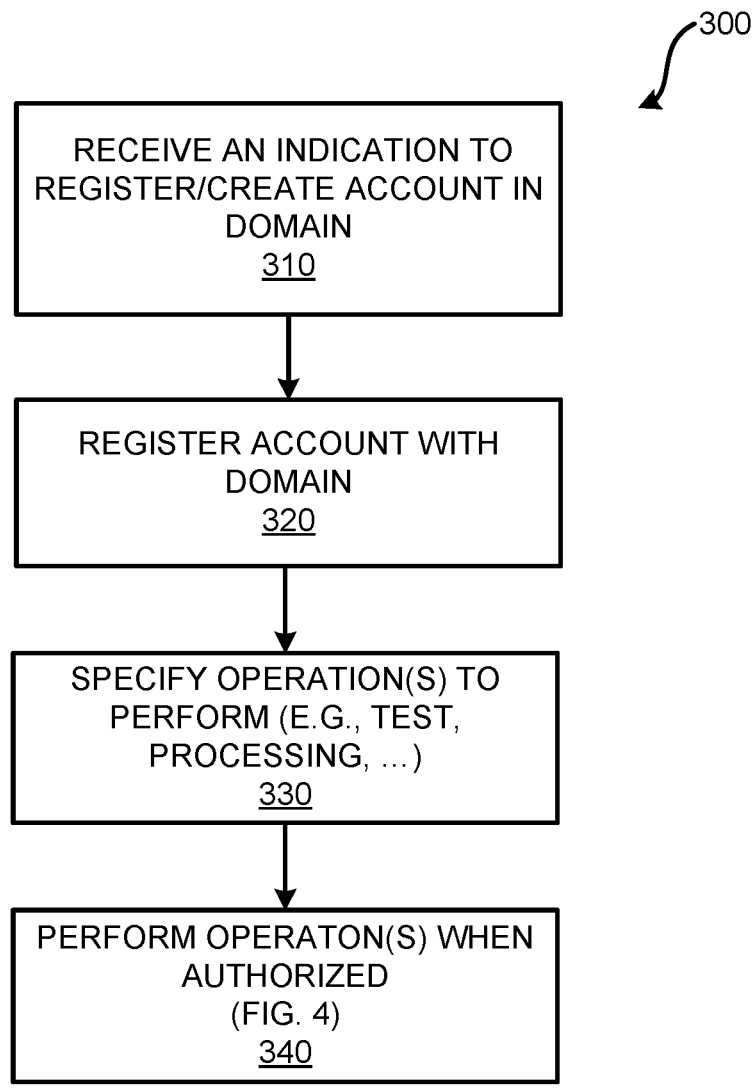
FIG. 3 is a flow diagram showing an illustrative routine for protecting customer data using different domains.
Figure 4:
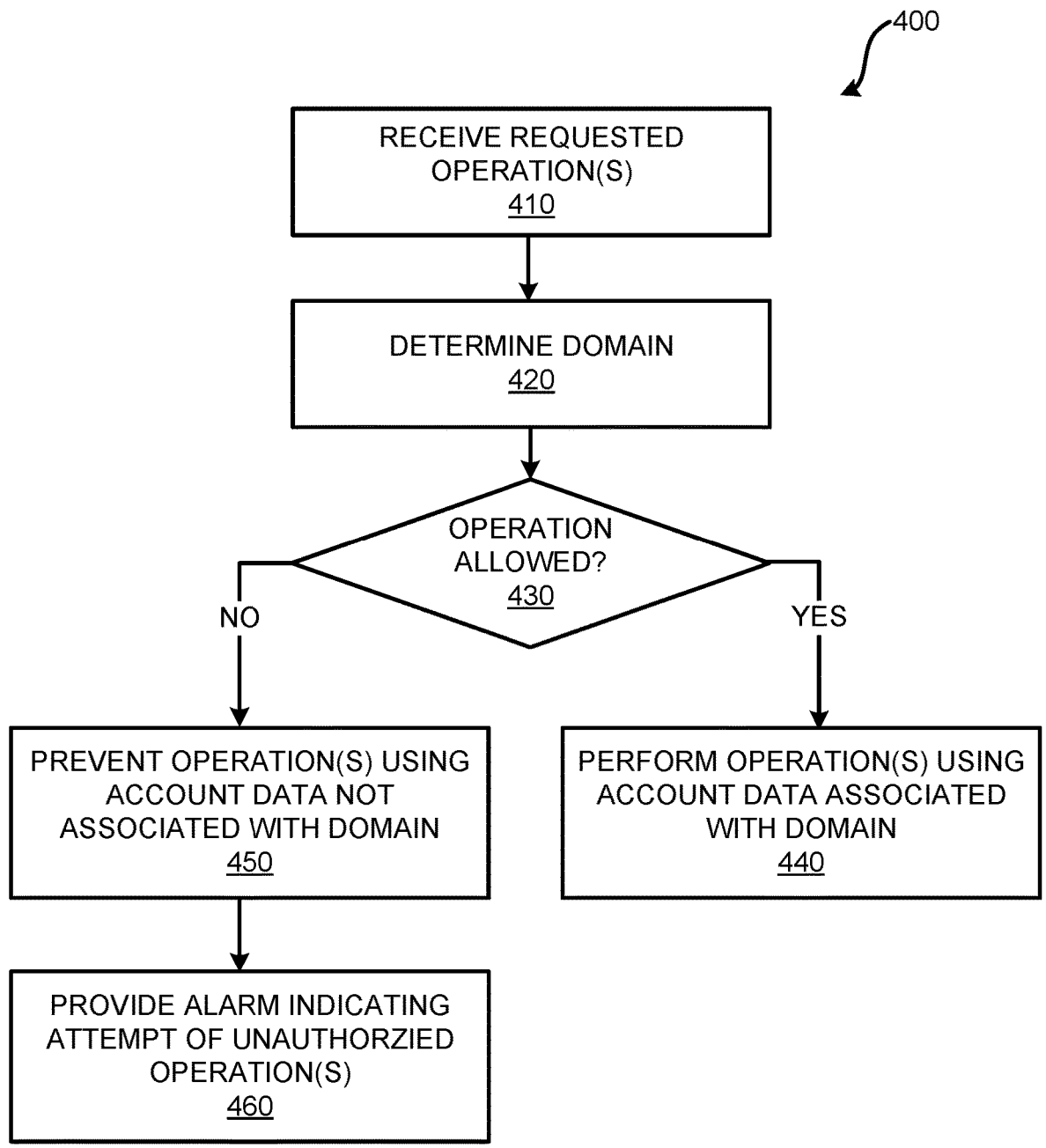
FIG. 4 is a flow diagram showing an illustrative routine for determining whether operation(s) are allowed to be performed based on whether an account is part of a domain.

FIGS. 3-4 are flow diagrams showing illustrative routines 300, and 400, for protecting customer data using domains, according to examples disclosed herein. It should be appreciated that the logical operations described herein with respect to FIG. 3, FIG. 4, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

FIG. 3 is a flow diagram showing an illustrative routine for protecting customer data using different domains. At 310, an indication to register/create an account in a domain is received. As discussed above, the indication may be a request received from a user 122, via a UI 140, a domain registry API 132, and/or some other input mechanism. In some configurations, the user 122 indicates the account(s) 154 to register within a particular domain 160.

At 320, the account 154 is registered with the domain 160. As discussed above, the DR service 130 may store registration data within one or more data stores, such as data store 150 indicating the registration of an account 154 with one or more domains. In some examples, the registration data is stored in one or more databases, that may be accessed directly by the DR service 130 and/or through one or more database services (not shown). As discussed above, in some examples, an account may be registered in more than one domain.

At 330, the operation(s) to perform are specified. As discussed above, the user 122 may perform operation(s) that test different scenarios and/or perform operations for specified accounts that are registered with a domain. According to some examples, the operation(s) may be specified using one or more workflows.

At 340, the operation(s) are performed when authorized. As discussed above, the DR service 130, or some other component or service 120, may determine whether an account 154 is registered within a domain before performing an operation involving the account 154 and/or account data 152 that is associated with the account. More details are provided below with reference to FIG. 4.

FIG. 4 is a flow diagram showing an illustrative routine 400 for determining whether operation(s) are allowed to be performed based on whether an account is part of a domain, according to examples disclosed herein.

At 410, a requested operation(s) is received. As discussed above, the request may be received from a user 122, via a UI 140, the domain registry API 132, or via some other component or device. For example, a user 122 may specify to run a workflow for accounts in a specified domain.

At 420, the domain in which the requested operation(s) are to be performed is determined. As discussed above, the domain 160 may be one or more domains 160 that include one or more registered accounts 154. According to some examples, one or more of the domains 160 may be a test domain in which test scenarios may be performed while safeguarding accounts not registered with the domain.

At 430, a determination is made as to whether the operation is allowed. As discussed above, the DR service 130, or some other component or device, may determine if the operation can be performed using a specified account(s). When the operation is allowed, the routine moves to 440 where the operation(s) are performed. When the operation is not allowed, the routine moves to 450 where the operation(s) are prevented.

At 460, an alarm, or some other indication, is provided that indicates the attempt to perform the unauthorized operation(s). As discussed above, the DR service 130 may provide the alarm to one or more designated user(s) indicating the attempt to perform the unauthorized operation(s).

Figure 5:
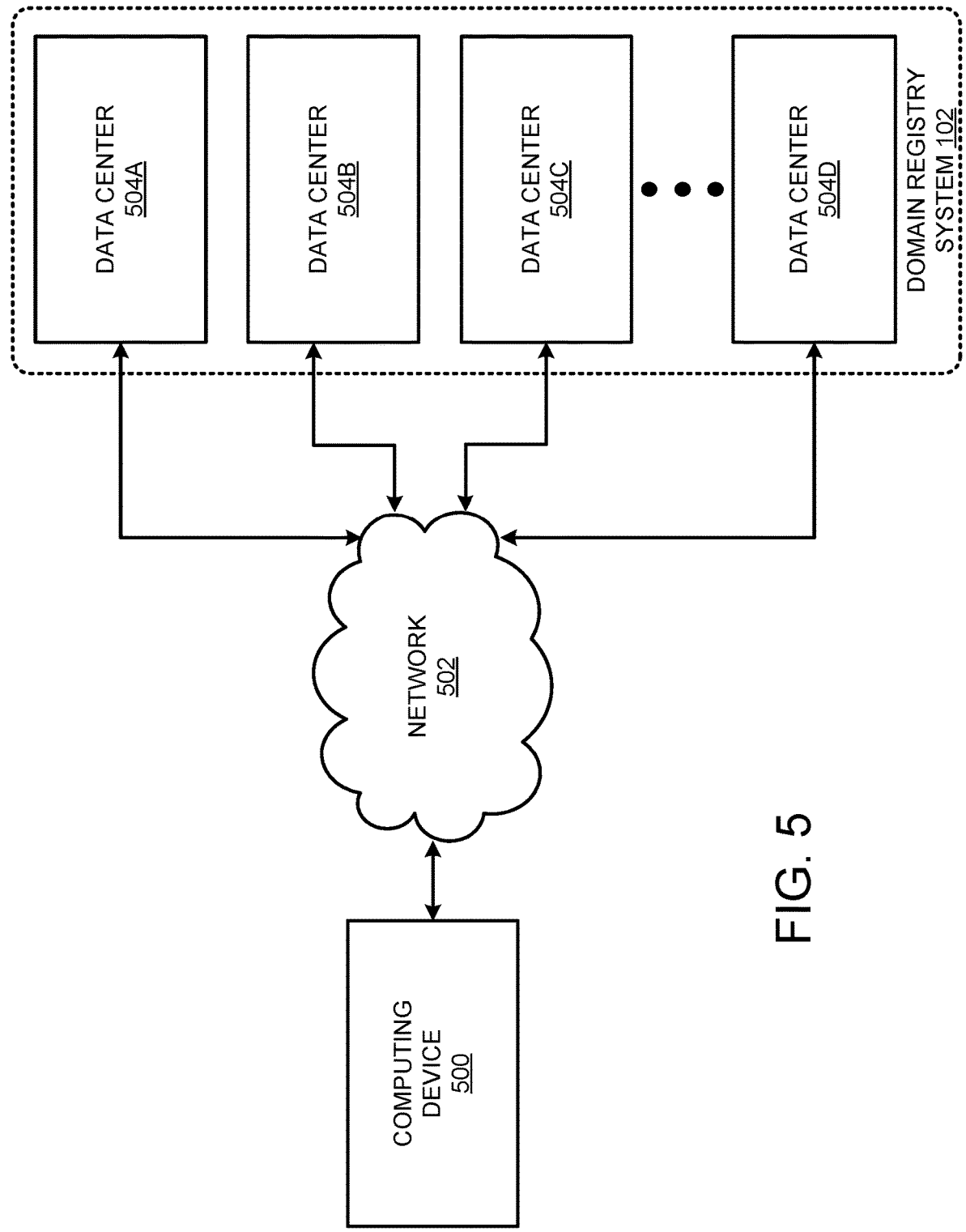
FIG. 5 is a system and network diagram that shows an illustrative operating environment including several data centers that can be configured to implement aspects of the functionality described herein.

FIG. 5 is a system and network diagram that shows one illustrative operating environment for the configurations disclosed herein that includes a DR system 102 that can be configured to provide the functionality described above. As discussed above, the DR system 102 can execute network services that provide computing resources for implementing the functionality disclosed herein. The computing resources implemented by the DR system 102 can be data processing resources, such as virtual machine ("VM") instances, data storage resources, networking resources, data communication resources, network services, and other types of resources.

The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The DR system 102 can also include and utilize other types of computing resources not mentioned specifically herein.

As also discussed above, the computing resources provided by the DR system 102 are enabled in one implementation by one or more data centers 504A-504D (which might be referred to herein singularly as "a data center 504" or collectively as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative configuration for a data center 504 that can be utilized to implement the technologies disclosed herein will be described below with regard to FIG. 7.

The users can access the services provided by the DR system 102 over a network 502, which can be a wide area communication network ("WAN"), such as the Internet, an intranet or an Internet service provider ("ISP") network or a combination of such networks. For example, and without limitation, a computing device 500 operated by a user or other user of the DR system 102, such as the computing device 114, can be utilized to access the DR system 102 by way of the network 502. It should be appreciated that a local-area network ("LAN"), the Internet, or any other networking topology known in the art that connects the data centers 504 to remote users and other users can be utilized. It should also be appreciated that combinations of such networks can also be utilized.

Figure 6:
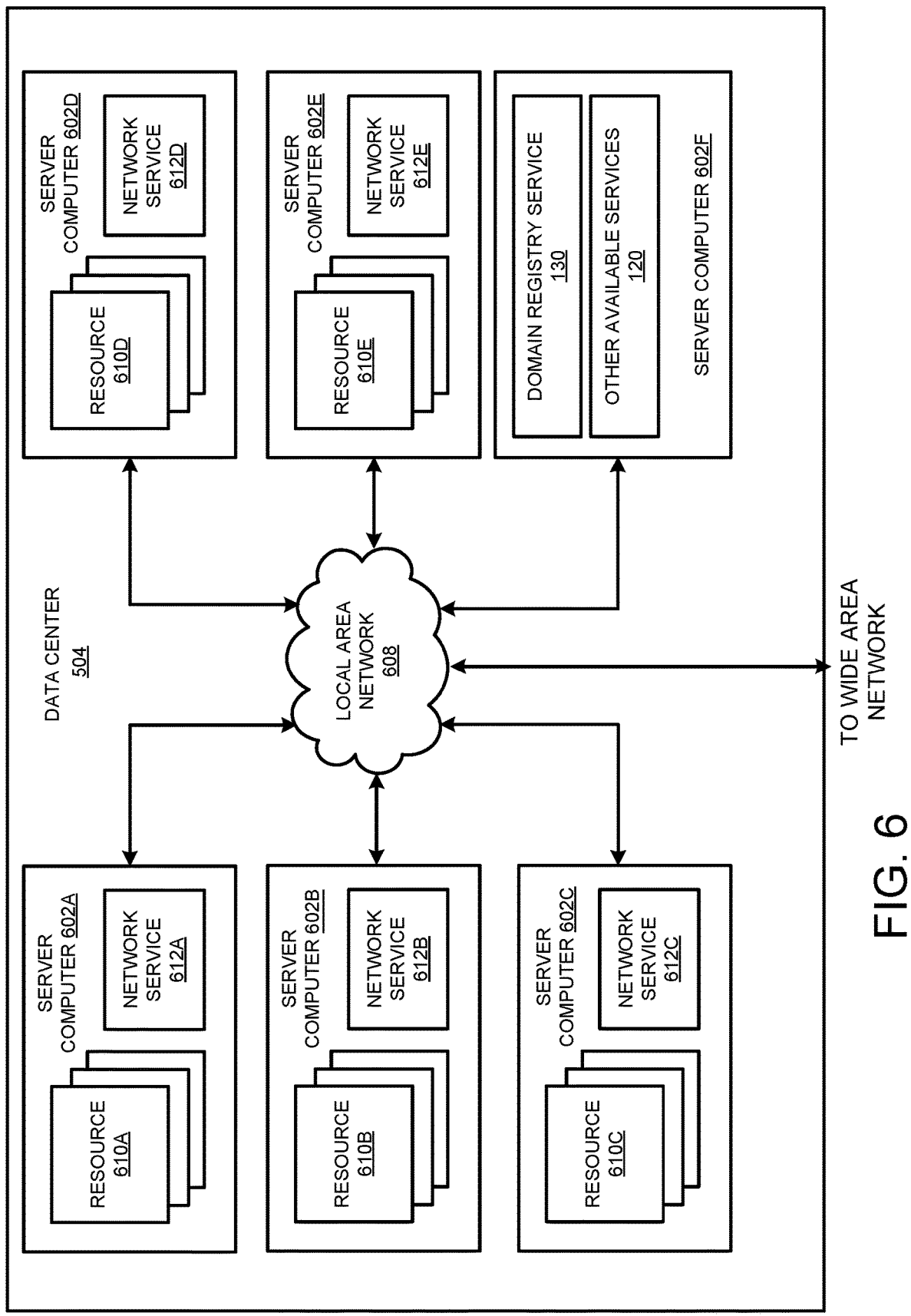
FIG. 6 is a computing system diagram illustrating a configuration for a data center that can be utilized to implement aspects of the technologies disclosed herein.

FIG. 6 is a computing system diagram that illustrates examples for a data center 504 that can be utilized to implement the DR service 130, other available services 120, and the other functionality disclosed herein. The example data center 504 shown in FIG. 6 includes several server computers 602A-602F (which might be referred to herein singularly as "a server computer 602" or in the plural as "the server computers 602").

The server computers 602 can be standard tower, rack-mount, or blade server computers configured appropriately for providing various types of computing resources 610 for implementing the functionality disclosed herein. As mentioned above, the computing resources 610 provided by the data center 504 can be data processing resources such as VM instances or hardware computing systems, data storage resources, database resources, networking resources, and others. Some of the servers 602 can also be configured to execute network services 612A-612-E, respectively, capable of instantiating, providing and/or managing the computing resources 610A-610E.

The data center 504 shown in FIG. 6 also includes a server computer 602F that can execute some or all of the software components described above. The server computer 602F can also be configured to execute other components and/or to store data for providing some or all of the functionality described herein. In this regard, it should be appreciated that components or different instances of the services can execute on many other physical or virtual servers in the data centers 504 in various configurations.

In the example data center 504 shown in FIG. 6, an appropriate LAN 608 is also utilized to interconnect the server computers 602A-602F. The LAN 608 is also connected to the network 502 illustrated in FIG. 5. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 504A-504D, between each of the server computers 602A-602F in each data center 504, and, potentially, between computing resources 610 in each of the data centers 504. It should be appreciated that the configuration of the data center 504 described with reference to FIG. 6 is merely illustrative and that other implementations can be utilized.

Figure 7:
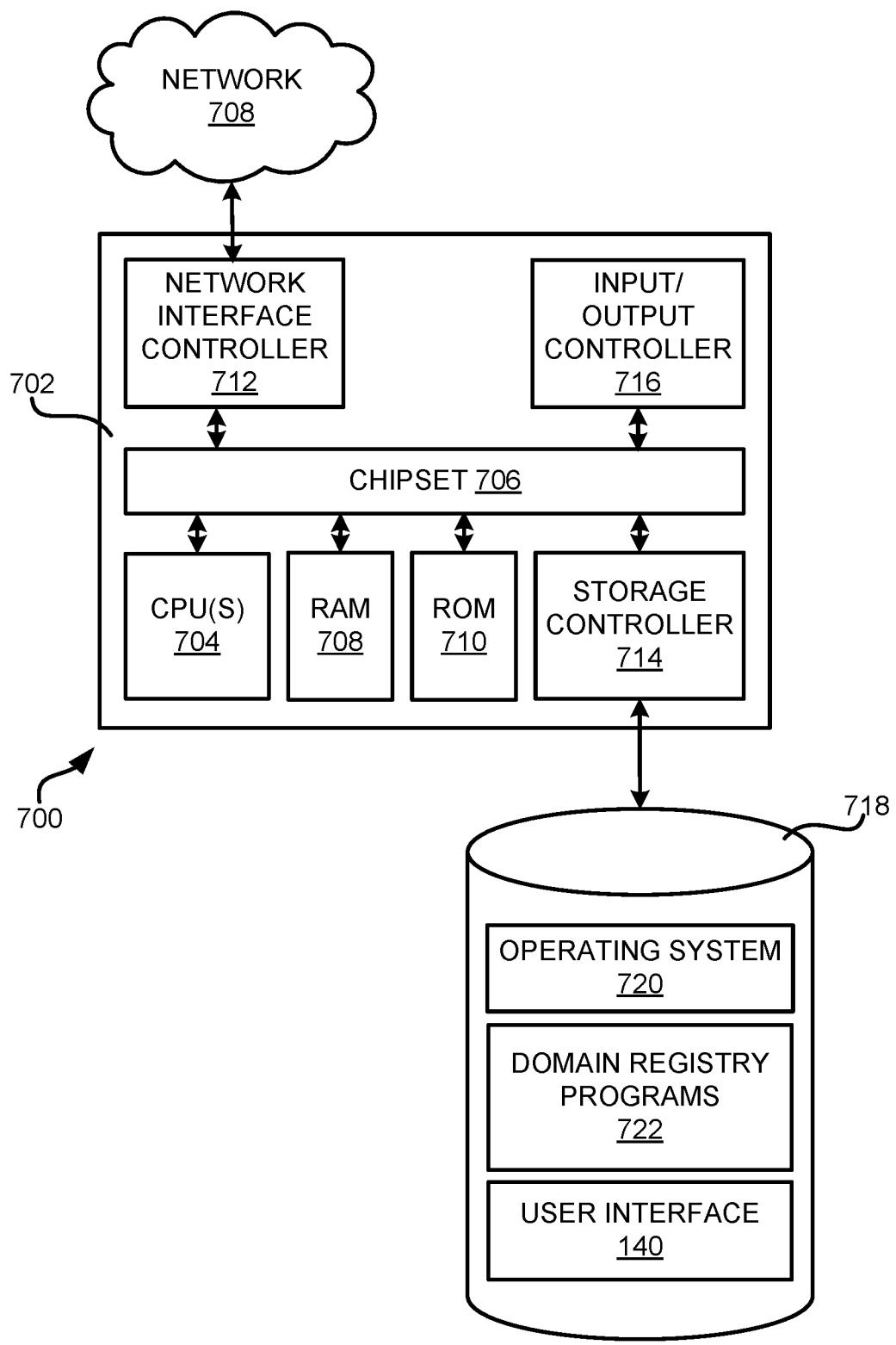
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chip set 706 can provide an interface to a RAM 708, used as the main memory in the computer 700. The chipset 706 can further provide an interface to a computer-readable storage medium such as a read-only memory ("ROM") 710 or non-volatile RAM ("NVRAM")

for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 708. The chipset 706 can include functionality for providing network connectivity through a NIC 712, such as a gigabit Ethernet adapter. The NIC 712 is capable of connecting the computer 700 to other computing devices over the network 708. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, domain registry programs 722 for providing functionality associated with the DR system 102, user interface 140, and data, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 718 can store other system or application programs and data utilized by the computer 700.

In examples, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to examples, the computer 700 has access to computer-readable storage media storing computer-executable instructions which, when executed by the computer 700, perform the various processes described above with regard to FIGS. 1-7. The computer 700 can also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or can utilize an architecture completely different than that shown in FIG. 7.

Based on the foregoing, it should be appreciated that technologies for protecting customer data using domains have been described herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
one or more processors; and
a non-transitory computer-readable storage medium having instructions stored thereupon which, when executed by the one or more processors, cause the system to:
receive a request to register an account of a service provider network in a test domain, wherein other accounts are associated with one or more other domains of the service provider network;
register the account in the test domain, wherein registering the account includes adding registry data to a data store indicating that the account is registered in the test domain, and wherein the test domain comprises one or more authorized operations authorized to be performed on accounts registered in the test domain;
receive a request to perform a test that includes operations that involve the account in the test domain, wherein the operations interact with one or more services provided by the service provider network in a production environment and use account data associated with the account;
determine that each operation of the test corresponds to at least one of the one or more authorized operations;
determine that the operations are authorized to be performed based on a first determination that each operation of the operations corresponds to the at least one of the one or more authorized operations authorized to be performed on the accounts registered in the test domain, and a second determination that the account is registered in the test domain; and
perform the operations based on a third determination that the operations are authorized to be performed, wherein data associated with the other accounts remains unaltered as a result of performance of the operations.

2. The system of claim 1, wherein performing the operations comprises generating a first bill for the account in the test domain using a first billing workflow, and wherein the instructions further cause the system to generate a second bill for the other accounts using a second billing workflow.

3. The system of claim 1, wherein the instructions further cause the system to expose a domain registry Application Programming Interface (API), wherein the domain registry API exposes functionality to register the account with the test domain, to determine whether the account is registered to the test domain, and to update a registration of the account.

4. The system of claim 1, wherein registering the account in the test domain comprises updating a domain table that includes first data identifying the account and, second data identifying that the account is registered to the test domain.

5. A computer-implemented method, comprising:
receiving a request to register one or more first accounts of a service provider network in a first domain, wherein first data associated with the one or more first accounts is segmented from second data associated with one or more second accounts registered to one or more second domains such that account data associated with the one or more second accounts remains unchanged from a performance of one or more operations that involve the one or more first accounts, and wherein the first domain comprises one or more authorized operations authorized to be performed on accounts registered in the first domain;
registering the one or more first accounts in the first domain;
receiving a request to perform the one or more operations using functionality provided within a production environment of the service provider network;
determining that the one or more operations are authorized based at least in part on determining that each operation of the one or more operations corresponds to at least one of the one or more authorized operations; and
causing the one or more operations to be performed based at least in part on determining that the one or more operations are authorized to be performed on the accounts registered in the first domain and that the one or more first accounts are registered in the first domain.

6. The computer-implemented method of claim 5, further comprising providing an application programming interface (API) that exposes functionality to determine whether the one or more first accounts are registered in the first domain.

7. The computer-implemented method of claim 5, wherein registering the one or more first accounts in the first domain comprises registering the one or more first accounts in a test domain that is associated with testing operations within the production environment of the service provider network.

8. The computer-implemented method of claim 5, further comprising providing an application programming interface (API) that exposes functionality to register accounts with domains.

9. The computer-implemented method of claim 8, wherein the request to register the one or more first accounts in the first domain comprises:
creating the at least one of the one or more first accounts; and
registering the one or more first accounts in the first domain.

10. The computer-implemented method of claim 5, wherein performing the one or more operations comprises using a billing service in the production environment of the service provider network to perform at least a portion of the one or more operations.

11. The computer-implemented method of claim 5, further comprising:
receiving a second request to move the at least one of the one or more first accounts from the first domain to a different domain; and
moving the at least one of the one or more first accounts from the first domain to the different domain.

12. The computer-implemented method of claim 5, further comprising:
generating a graphical user interface (GUI) that includes user interface (UI) elements that, upon selection, are configured to register the one or more first accounts with the first domain; and
providing the GUI to a computing device of a user associated with the one or more first accounts.

13. A system, comprising:
one or more processors; and
a non-transitory computer-readable storage medium having instructions stored thereupon which, when executed by the one or more processors, cause the system to perform actions, comprising:

receiving a request to register one or more first accounts of a service provider network in a first domain, wherein first data associated with the one or more first accounts is segmented from second data associated with one or more second accounts registered to one or more second domains such that account data associated with the one or more second accounts remains unchanged from a performance of one or more operations that involve the one or more first accounts, and wherein the first domain comprises one or more authorized operations authorized to be performed on accounts registered in the first domain;

registering the one or more first accounts in the first domain;

receiving a request to perform the one or more operations using functionality provided within a production environment of the service provider network;

determining that the one or more operations are authorized based at least in part on determining that each operation of the one or more operations corresponds to at least one of the one or more authorized operations authorized to be performed on the accounts registered in the first domain and that the one or more first accounts is registered in the first domain; and causing the one or more operations to be performed based at least in part on determining that the one or more operations are authorized.

14. The system of claim 13, the actions further comprising providing an application programming interface (API) that exposes functionality to determine whether the one or more first accounts are registered in the first domain.

15. The system of claim 13, wherein registering the one or more first accounts in the first domain comprises registering the one or more first accounts in a test domain that is associated with testing operations within the production environment of the service provider network.

16. The system of claim 13, the actions further comprising providing an application programming interface (API) that exposes functionality to register accounts with domains.

17. The system of claim 16, wherein the request to register the one or more first accounts in the first domain comprises:

creating the at least one of the one or more first accounts; and registering the one or more first accounts in the first domain.

18. The system of claim 13, wherein performing the one or more operations comprises using a billing service in the production environment of the service provider network to perform at least a portion of the one or more operations.

19. The system of claim 13, the actions further comprising:

receiving a second request to move the at least one of the one or more first accounts from the first domain to a different domain; and moving the at least one of the one or more first accounts from the first domain to the different domain.

20. The system of claim 13, the actions further comprising:

generating a graphical user interface (GUI) that includes user interface (UI) elements that, upon selection, are configured to register the one or more first accounts with the first domain; and providing the GUI to a computing device of a user associated with the one or more first accounts.

* * * * *